(12) United States Patent
Silberstein et al.

(10) Patent No.: US 7,225,149 B2
(45) Date of Patent: May 29, 2007

(54) METHOD FOR SELLING JEWELRY WITH STONES FROM A SINGLE SOURCE

(76) Inventors: Benjamin Silberstein, 26 Quickway Rd., Unit 304, Monroe, NY (US) 10950; Isaac Friedman, 5 Siget Ct. #301, Monroe, NY (US) 10950

( * ) Notice: Subject to any disclaimer, the term of this patent is extended or adjusted under 35 U.S.C. 154(b) by 33 days.

(21) Appl. No.: 10/802,359

(22) Filed: Mar. 16, 2004

(65) Prior Publication Data
US 2005/0209864 A1  Sep. 22, 2005

(51) Int. Cl.
*G06Q 30/00* (2006.01)
*G06F 17/30* (2006.01)

(52) U.S. Cl. .......................... 705/26; 705/27; D11/16; D11/34; D11/89

(58) Field of Classification Search .......... 705/26–27, 705/1; 63/26, 32–40; D11/1, 16, 34, 89
See application file for complete search history.

(56) References Cited

U.S. PATENT DOCUMENTS

| | | | | |
|---|---|---|---|---|
| 1,758,447 | A * | 5/1930 | Liebs | 63/15.1 |
| 3,755,025 | A * | 8/1973 | Jones | 156/61 |
| 5,950,178 | A * | 9/1999 | Borgato | 705/37 |
| 6,145,341 | A * | 11/2000 | Leong | 63/1.11 |
| 2002/0133431 | A1* | 9/2002 | West et al. | 705/27 |
| 2002/0166339 | A1* | 11/2002 | Adelman | 63/29.1 |
| 2003/0163938 | A1* | 9/2003 | Norton | 40/493 |
| 2005/0187831 | A1* | 8/2005 | Gershburg et al. | 705/27 |
| 2005/0197951 | A1* | 9/2005 | Tolkowsky | 705/37 |

FOREIGN PATENT DOCUMENTS

| | | | |
|---|---|---|---|
| CA | 2343448 | * | 10/2002 |
| JP | 01017605 | * | 1/1989 |

OTHER PUBLICATIONS www.bluenile.com. Feb. 16, 2003. extracted from www.archive.org Oct 21, 2005.*
www.moonstone-jewelry.com/lesbian-ring-511.html. Oct. 21, 2002. extracted from www.archive.org Oct. 24, 2005.*
Press release "Wedding Vow Rings Helps Couples Pledge Love". Cranston, RI. Jun. 11, 2004.*
www.keepsakemugs.com. Copywrite 2003/2004. Accessed Oct. 24, 2005.*
Moczynski, Kisten. "Mother goes gift shopping for children in DCF custody". News Journal. Daytona Beach, Fla. Dec. 10, 2003. p. 03.C. [extracted from Proquest May 25, 2006].*
Anonymous. "Diamond Survey says stores concerned about Internet". New Tork, Ny. Mar. 1, 2004. vol. 98, Iss. 5; pp. 23, 1 pgs. [extracted from Proquest May 25, 2006].*

(Continued)

*Primary Examiner*—Matthew S. Gart
*Assistant Examiner*—William J. Allen
(74) *Attorney, Agent, or Firm*—Feldman Law Group PC

(57) ABSTRACT

A method for selling jewelry is provided where a rough stone is selected and cut to yield a number of stones that are mounted onto a set of jewelry including at least two pieces of jewelry, one for a female and the other for a male with the female usually getting a larger portion of the rough stone.

20 Claims, 2 Drawing Sheets

OTHER PUBLICATIONS www.atalntisring.com. Dec. 16, 2003. [extracted from www.archive.org May 25, 2006].*

Schupak, Hedda. "Two Rocks in One". Secaucus: Sep. 2005. vol. 176, Iss. 9; p. 58, 1 pgs. [extracted from Proquest May 25, 2006].*

"De Beers: high-end independents, Web drove diamond jewelry sales in 2005". National Jeweler. Mar. 16, 2006. [extracted from Dialog database Feb. 6, 2007].* www.atalntisring.com. Dec. 16, 2003. [extracted from www.archive.org May 25, 2006].* www.bluenile.com. Feb. 16, 2003. [extracted from www.archive.org Oct. 21, 2005.].* www.moonstone-jewelry.com/lesbian-ring-511.html. Oct. 21, 2002. [extracted from www.archive.org Oct. 24, 2005 ].*

* cited by examiner

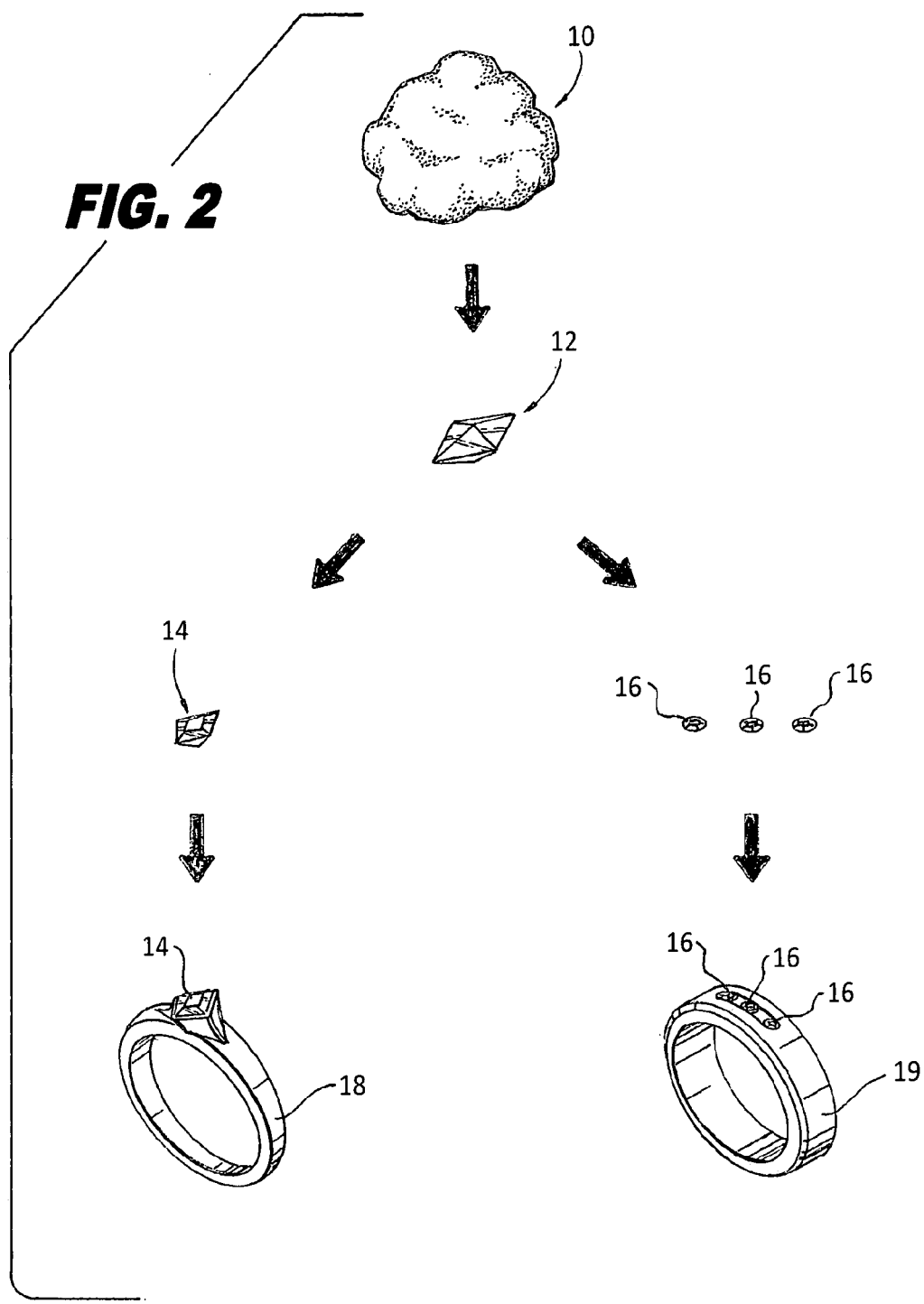

METHOD FOR SELLING JEWELRY WITH STONES FROM A SINGLE SOURCE

FIELD OF THE INVENTION

The present invention deals with a method of selling jewelry and more specifically, selling jewelry with stones from a single source.

BACKGROUND OF THE INVENTION

The virtually universal interpretation of the engagement ring is a symbol of ever lasting purity, love, devotion and commitment between two people. Because diamond is the hardest and strongest mineral on earth, it was seen to resist fire and steel and thus symbolize the unbending union of a man and woman in wedlock.

Typically, jewelers stock a fairly large collection of engagement ring setting designs. These are rings without any stones set, also known simply as a setting. A prospective buyer, usually a male with the intention of proposing, selects a setting design. Often, his female partner helps, or more likely, supervises the selection process. Once the setting is chosen, an appropriate stone is selected. Settings are usually designed to accept specific stone cuttings and designs. For example, a setting may only be able to accept a princess cut diamond between 1 and 1.5 carats.

Alternatively, the specific stone may be chosen first, determining the cut and size before choosing an acceptable setting. These steps in the selection process are reversible, the stone, or setting may be selected first. Once a stone is selected, it is mounted into the selected setting.

Oftentimes, however, jewelry is given as a symbol of commitment and love without the presence of a formal engagement. For example, jewelry is commonly given to children from their parents to commemorate special occasions such as sweet sixteens and graduations. Boyfriends often give jewelry to girlfriends well before a formal engagement. Sometimes, the jewelry is given with the intention, or promise to eventually get engaged. Such rings given with that type of promise are known as "promise rings".

At the time of this writing, there are no known alternatives to the traditional method of selecting engagement and promise rings outlined above.

SUMMARY OF THE INVENTION

In accordance with an embodiment of the present invention, a method for selling jewelry is provided. A retailer stores an inventory of rough diamonds with each one's yield (how many finished stones the rough stone can produce). A giver selects a rough stone which may be presented in rough form to an intended recipient or cut and polished first to provide at least two finished stones, a major stone and a remainder. The major stone should be a major portion of the rough stone and the remainder may be one or several stones, each smaller than the major stone. The finished stones may either be presented to the recipient in loose form or set into jewelry. The major stone is set into a piece of jewelry for the recipient and the remainder set into a piece of jewelry for the giver.

In more detail, the method comprises the steps of providing a rough stone, determining a cutting configuration for the rough stone, the cutting configuration including a first stone and a second stone, cutting the rough stone to provide the first stone and the second stone, the first stone going to a first person and the second stone going to a second person, the first person and second person having a specific relationship.

BRIEF DESCRIPTION OF THE DRAWINGS

FIG. 2 shows a rough stone being cut and divided among jewelry according to an embodiment of the present invention.

DETAILED DESCRIPTION

Figure 1:
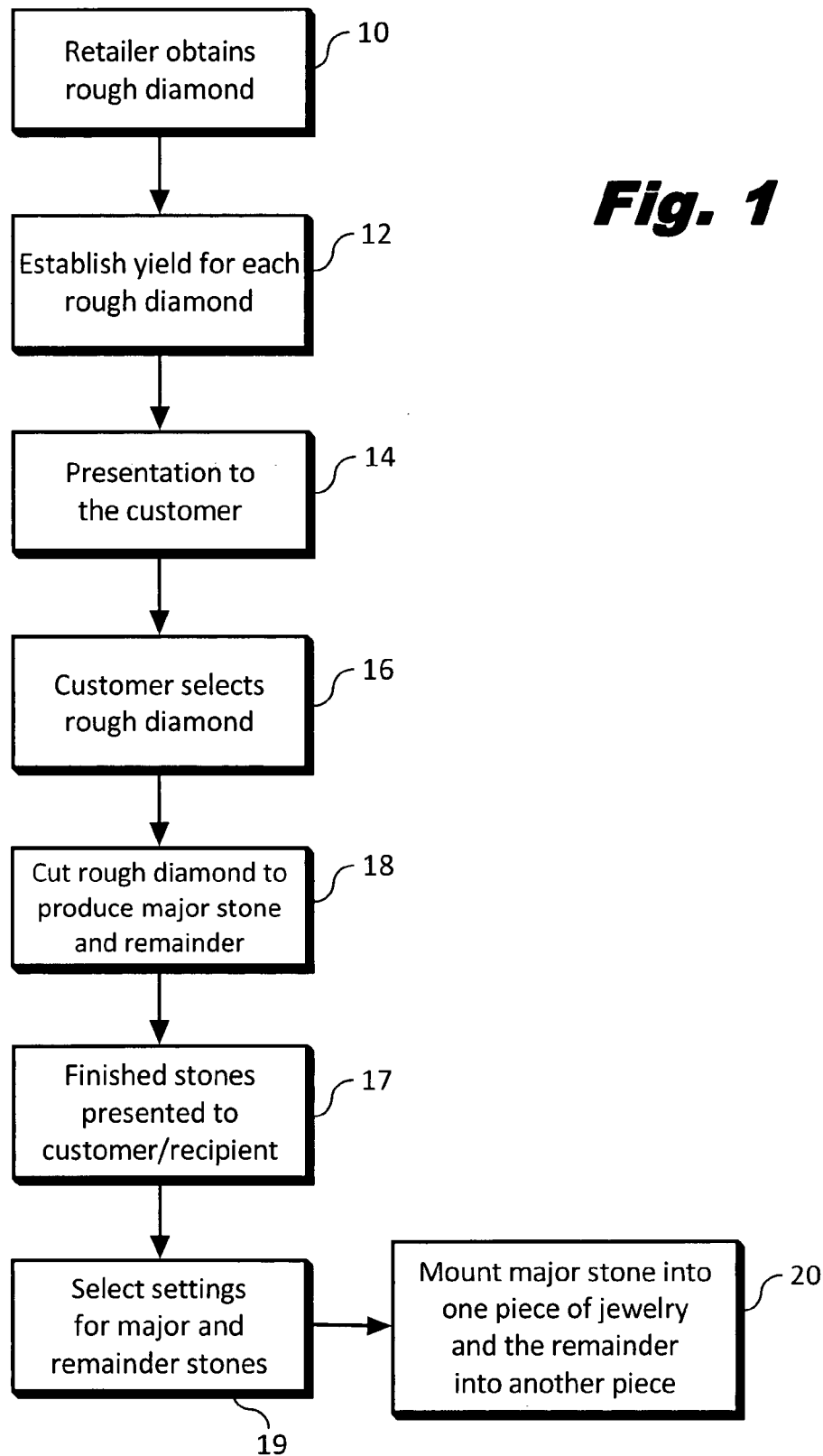
FIG. 1 is a flowchart outlining a method for selling jewelry according to an embodiment of the present invention.

From its inception, the diamond engagement ring has not changed other than the shape of the diamond itself with different cut designs. The present invention provides a new method for selling engagement and promise rings with corresponding jewelry, which may be a ring, bracelet, necklace or any other form of jewelry.

A rough precious stone is selected. The stone may be a diamond, ruby, emerald, sapphire, or any other precious or semi-precious stone typically mounted in jewelry. Its yield (the type and number of finished stones provided by the rough stone) is determined. For example, one rough stone may provide three finished stones.

A giver selects the rough stone. The rough stone may be presented to the intended recipient as is, in rough form or cut first. The rough stone is cut and finished to provide, say, two finished stones, a major stone and a remainder. The major stone is al majority of the mass of the rough stone and the remainder a minority. The major stone may be presented to a recipient loose and unmounted or set into a piece of jewelry.

In the case where the major stone is presented loose, or without jewelry, the recipient is given the chance to choose a setting for the major stone. The remainder stone is set onto another piece of jewelry for the giver. The present invention finds particular application when selling engagement rings and wedding bands because it creates an even stronger emphasis on the romance and the sentimentality of choosing an engagement ring and wedding band since the same rough diamond is used to provide the stones in the male and female rings.

To further understand the yield of a rough stone, for the purposes of illustration and to provide an example, diamonds will be used primarily throughout the rest of this disclosure. It should be noted, however, that the principles of the present invention may apply to any precious or semi-precious stone or jewel.

Diamonds are classified by four characteristics, known as "the four C's," cut, color, clarity and cart weight. The standards for quantifying each characteristic is set and maintained by several standards labs.

Cut refers to the angles of a diamond surface and determine its ability to handle light, which leads to brilliance. When a diamond is well-cut, light enters the top of the diamond and reflects from one side to the other before reflecting back out of the diamond and to the observer's eye. This light is the brilliance and creates the flashing, fiery effect that makes diamonds so mesmerizing.

Color refers to the presence or absence of color in white diamonds. Color is a result of the composition of the diamond, and never changes over time. Diamonds are found in nature in a wide range of colors, from completely colorless (the most desirable trait) to slightly yellow, to brown, and then to "fancy" colors, such as blues, greens, bright yellows, pinks, and even reds. Most diamonds selected for wedding bands are white (clear) or nearly white. Acting as a prism, a diamond divides light into the colors of the spectrum and reflects this light as colorful flashes called fire. Like light passing through a clear glass window, a colorless diamond allows more light to pass through it than a colored diamond, emitting more sparkle and fire. The formation process of a diamond ensures that only a few, rare diamonds are truly colorless, giving off more fire and sparkle. Thus the whiter a diamond's color, the greater its value.

Clarity refers to the presence of identifying characteristics on and within the stone. This refers to the number, position and size of the inclusions that occur naturally inside diamonds. Diamond grading is usually done under ten-power (10×) magnification. The less obvious and fewer inclusions, the more valuable the diamond. While most characteristics are inherent qualities of the rough diamond (uncut) and have been present since the earliest stages of the crystal's growth below ground, a few are actually a result of the harsh stress that a diamond undergoes during the cutting process itself. Diamonds with no or few inclusions and blemishes are more highly valued than those with less clarity, not just because they are more pleasing to the eye, but also because they are rarer.

A carat is the unit of measurement used to refer to the weight of a diamond. One carat is equal to 200 milligrams, or 0.2 grams.

FIG. 1 shows a flowchart outlining the general steps of a method in accordance with an embodiment of the present invention. A jewelry retailer obtains a rough, uncut stone (step 10), a diamond in this case. Rough diamonds are crystals or fragments of crystals that have not been polished, the processing of which enhances the beauty of diamonds for use in jewelry. This step may be done repeatedly so that the retailer has an inventory of rough diamonds to provide a selection to potential customers.

A yield is determined for each rough diamond (step 12) by an experienced cutter, preferably with the aid of computerized rough diamond mapping and analysis systems to determine the cutting configuration that will achieve the maximum possible yield. The yield quantifies the number of stones that can be taken from the large rough and what cuts are available. For example, a 6 carat stone may yield one 2.0 carat marquis cut (major stone) and three 0.5 carat round brilliant cut diamonds (remainder stones). In addition, more than one cutting configuration is possible with each rough stone. The same 6 carat stone may also yield one 1.5 carat emerald cut and two 0.75 carat round brilliant cut stones. Because exact grading certificates are not available, an approximation can be obtained from the computer analysis.

Normally, with the current state of technology, rough stones have about a 50% yield. In other words, a rough stone provides half its weight in finished stones. As technology changes, however, the yield may increase and it is possible that cutting configurations may include any combination of stone cuts and sizes, for example:

One 2.15 carat princess cut stone and three 0.25 carat baguettes

Three 1.25 carat round brilliant cut stones

One 1.25 carat marquis cut stone and one 1.0 carat emerald cut stone depending on the yield of the rough stone.

Preferably, a presentation is done for the customer (step 14) to educate them on rough stones, the cutting process, the overall inventive method, and to present the rough diamond inventory for selecting a rough stone. The presentation (step 14) is optional and not necessary to practicing the inventive method.

The presentation (step 14) should outline the process of cutting a rough stone and the options included in the purchase, allowing the customers to see the available options in diamond cuts and sizes and demystify the process of cutting and polishing rough stones. Preferably, the presentation is adaptable to the Internet and accessible through a web page. While consumers are generally well educated about diamonds in general, there is not much awareness of rough diamonds and their place in the jewelry chain because most diamond education emphasizes the four C's.

After the presentation (step 14), a rough diamond is selected (step 16). Using an engagement to wed as an example, in traditional roles, the ring giver is a male and the significant other, a female. It should be noted that the roles may be reversed and the woman could very well be the giver of the uncut diamond. It is even possible that the giver and significant other are the same sex. For the sake of simplicity and ease of illustration, this example assumes the giver is a man and the significant other, a woman.

Assume the case where a man and woman pick out an engagement ring together The female knows that she wants a 2.0 carat round brilliant cut center stone with the remainder to be set into a bracelet for the man so he can wear a piece of jewelry showing their engagement as well. After the presentation (step 14), all the rough diamonds that can yield a 2.0 carat round brilliant cut major stone are shown to the couple. The remainder for each rough diamond may differ and a single rough diamond may yield a number of different remainder stone configurations after the major is cut. The couple decides on a rough diamond with a yield of one 2.0 carat brilliant cut major stone and five small remainder diamond baguettes with the major stone destined for an engagement ring setting for the woman and the remainder to be set into a bracelet for the man.

Reversing the steps, assume as another example that the female has a setting picked out but is not sure what kind of stone she would like. Further assume the selected setting can only accommodate marquis or emerald cut stones between 1.0 and 1.5 carats. All rough diamonds that can yield a marquis and emerald cut stone between 1.0 and 1.5 carats are presented to the couple. Each rough diamond has a different yield, which is explained to the couple. There may be rough diamond with a yield of one 1.5 carat marquis cut major stone and two 0.5 carat brilliant cut secondary stones. Another rough diamond may yield one 1.5 carat marquis cut major and three 0.5 carat brilliant cut secondary stones. The female chooses the latter, one 1.5 carat marquis cut major and three 0.5 carat brilliant cut secondary stones, to have the major stone and two of the secondary stones set in her engagement ring and one of the secondary stones set into the wedding band for the man.

Alternatively, the male may select the rough stone on his own (step 16), without his significant other. In this case, he has a choice. He may have the rough stone cut (step 18) and then present the loose, finished stone to his partner (step 17) who would then select the setting (step 19) after it is cut. Or, he may go through the process on his own and present the finished piece of jewelry to the recipient.

In any case, a ring giver, alone or in conjunction with the recipient, selects the rough diamond (step 16). The rough diamond may be presented to the recipient in rough form (step 17), before being cut into finished stones, and then returned to the retailer for cutting (step 18), or cut (step 18) and then given to the recipient (step 17).

After the rough diamond is selected (step 16), it is cut (step 18). The first step in the cutting process is known as marking, which is done after examining each rough diamond to decide how it should be cut to yield the greatest value. As previously mentioned, each rough diamond is marked (step 12) before they are presented to the customer (step 14).

Once the rough stone is cut (step 18), a major stone, which is a majority of the rough stone, and a remainder stone or stones are produced (step 18). The major and remainder stones are presented to the customer (step 17). At this point, the customer may include the man alone (ring giver), or both the man and woman (giver and recipient) together. Settings are chosen for the stones (step 19), one for the major stone and one for the remainder. The set of jewelry to receive the finished stones may include, among others:

- an engagement ring for the woman and a bracelet for the man
- a male engagement ring and a female engagement ring
- two necklaces, one for a brother, the other for a sister as a gift from parents
- an engagement ring for the woman and a wedding band for the man
- a male and female wedding band
- three identical rings with identical stones for three related family members
- his and hers promise rings After choosing the settings (step 19), the major stone is set into a piece of jewelry for the female and the remainder into a piece of jewelry for the male (step 20).

It is clear that the possible combinations of stone types, yield and jewelry sets within the scope of the invention are virtually limitless. The only factor limiting a consumer's options is cost. It is conceivable that with a large enough rough stone, four diamonds may be produced for four pieces of jewelry. A father may want to create four pieces of jewelry with stones from single source for his four children. A grandparent may want ten pieces for his or her grandchildren.

FIG. 2 shows a rough diamond 10 going through the process of FIG. 1. Assume the rough diamond 10 has been analyzed and a yield of a 2.15 marquis cut stone and three 0.50 carat round brilliant cut stones is found. The rough diamond 10 is cut down to provide an octahedron 12 that is cleaved. The remaining parts are faceted into the marquis cut stone 14 and the round brilliant cut stones 16. The marquis stone 14 is mounted onto an engagement ring setting 18 and the three brilliant cut stones 16 set into a wedding band 19.

According to an alternative embodiment of the present invention, the customer does not have to select a rough stone, but rather, skips the rough stone selection process and selects the finished stones. In this case, the retailer will already have the stones cut and displays the finished stones from a single source. The customer can then choose the finished stones and the jewelry in which to set it.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for selling jewelry to a customer, the customer acting as a gift giver, the method comprising the steps of:
    providing a selection of rough stones to a customer;
    informing the customer about available options on cuts and sizes of stones that may be yielded from the selection of rough stones;
    choosing, by the customer, a specific rough stone from the selection of rough stones based on a specific available option chosen by the customer;
    cutting the specific rough stone into at least two cut stones as per the specific available option chosen by the customer, the at least two cut stones including a major stone and at least one remainder stone;
    selling the cut stones to the customer;
    presenting, by the customer, the cut stones to at least two recipients, whereby the customer and the recipients have a specific sentimental relationship, the cut stones yielded from the specific rough stone being symbolic of the sentimental relationship.

2. The method of selling jewelry as claimed in claim 1 wherein the customer and one of the recipients are same person.

3. The method of selling jewelry as claimed in claim 1 wherein the customer is a parent and the recipients are at least two children of the parent.

4. The method of selling jewelry as claimed in claim 1 wherein the customer is a grandparent and the recipients are at least two grandchildren of the grandparent.

5. The method of selling jewelry as claimed in claim 1 whereby the selection of rough stones have stones of different karat, color and clarity.

6. The method of selling jewelry as claimed in claim 1 further comprising the step of determining a cutting configuration for the specific rough stone.

7. The method of selling jewelry as claimed in claim 6 whereby the cutting configuration is any possible type of cut for a gemstone.

8. The method of claim 1 further comprising the step of: mounting the at least two stones to at least two pieces of jewelry, the pieces of jewelry being presented to the recipients.

9. The method of claim 2 wherein the specific sentimental relationship is husband and wife.

10. The method of claim 2 wherein the specific sentimental relationship is a life partner.

11. The method of claim 2 wherein the specific sentimental relationship is parent and child.

12. The method of claim 2 wherein the specific sentimental relationship is siblings.

13. The method of claim 2 wherein the specific sentimental relationship is persons engaged to be married.

14. The method of claim 1 wherein the step of providing a plurality of rough stones to a customer is presented over the Internet.

15. The method of claim 1 wherein the step of providing a plurality of rough stones to a customer is presented at a retail store.

16. The method of claim 1 wherein the step of providing a plurality of rough stones to a customer is presented in a catalogue.

17. The method of claim 1 wherein the specific rough stone is a diamond.

18. The method of claim 1 wherein the specific rough stone is a ruby.

19. The method of claim 1 wherein the specific rough stone is an emerald.

20. The method of claim 1 wherein the specific rough stone is a sapphire.

* * * * *